United States Patent [19]

Martens et al.

[11] Patent Number: 4,789,384

[45] Date of Patent: Dec. 6, 1988

[54] PROCESS FOR PARTIAL OXIDATION OF A HYDROCARBON-CONTAINING FUEL

[75] Inventors: Franciscus J. A. Martens; Hendrikus J. A. Hasenack, both of Amsterdam, Netherlands

[73] Assignee: Shell Oil Company, Houston, Tex.

[21] Appl. No.: 81,504

[22] Filed: Aug. 4, 1987

[30] Foreign Application Priority Data

Aug. 5, 1986 [GB] United Kingdom ............... 8619076

[51] Int. Cl.$^4$ ............................................. C10J 3/46
[52] U.S. Cl. .................................. 48/197 R; 48/206; 48/210; 48/212; 252/373
[58] Field of Search ................... 48/197 R, 202, 203, 48/206, 210, 212, 215, 86 R; 252/373; 110/347

[56] References Cited

U.S. PATENT DOCUMENTS

| | | | |
|---|---|---|---|
| 4,351,647 | 9/1982 | Marion et al. | 48/197 R |
| 4,458,607 | 7/1984 | Schoeber et al. | 48/197 R |
| 4,493,230 | 4/1984 | Stellaccio | 48/197 R |
| 4,502,633 | 3/1985 | Saxon | 48/197 R |

*Primary Examiner*—Peter Kratz

[57] ABSTRACT

A process for the partial oxidation of fuel using a multi-orifice burner comprising a central channel, and three concentric channels encircling the central channel, is disclosed, fuel being supplied through the second concentric channel at a specific velocity and oxygen being supplied through the other channels at specific mass flow distribution and velocities.

7 Claims, No Drawings

PROCESS FOR PARTIAL OXIDATION OF A HYDROCARBON-CONTAINING FUEL

BACKGROUND OF THE INVENTION

The invention relates to a process for partial oxidation of a hydrocarbon-containing fuel.

In such processes, it is necessary to insure fine atomization of the fuel, with good and rapid contacting or mixing of the fuel and an oxygen-containing gas (the oxygen-containing gas is usually air or pure oxygen, or a mixture thereof). Additionally, to control the temperature in the gasification zone, a moderator gas can be supplied to the zone.

One object of the invention is to provide a process for partial oxidation of a hydrocarbon-containing fuel wherein in situ fine atomization of the fuel is obtained. Another object of the invention is to provide a process for partial oxidation of a hydrocarbon-containing fuel wherein good and rapid mixing or contacting of oxygen and fuel is obtained and pre-ignition or flame-flashback is prevented.

SUMMARY OF THE INVENTION

The invention therefore provides a process for partial oxidation of a hydrocarbon-containing fuel comprising supplying an oxygen-containing gas and hydrocarbon-containing fuel to a gasification zone through a concentric arrangement of three oxygen passages or channels and one fuel passage or channel, and oxidizing said fuel and producing auto-thermically a gaseous stream containing synthesis gas under appropriate conditions. The process further comprises supplying oxygen-containing gas through the central channel of the concentric arrangement at a relatively low velocity of 21–42 m/sec; supplying oxygen-containing gas through the first concentric channel encircling the central channel at a relatively high velocity of 60–120 m/sec; supplying fuel through the second concentric channel encircling the first channel at a relatively low velocity of 3.0–3.8 m/sec; and supplying oxygen-containing gas through the third concentric channel encircling the second channel at a relatively high velocity of 60–102 m/sec.

In preferred embodiment of the invention, 5 to 40 mass percent of the oxygen-containing gas is supplied through the central channel.

In another advantageous embodiment of the invention, the respective velocities are measured at the outlet of the respective concentric channels into the gasification zone. The velocity measurement can be carried out in any way suitable for the purpose and will not be described in detail.

In still another advantageous embodiment of the invention, the oxygen-containing gas contains steam or carbon dioxide as a moderator. The gasification process is preferably carried out at a pressure of 0.1–12 MPa.

As indicated, the fuel and the oxygen-containing gas are supplied to the gasification zone through a concentric arrangement of three oxygen passages and one fuel passage. A central channel for oxygen supply is surrounded by a first annular channel for oxygen supply. The first annular channel is surrounded by a second annular channel for fuel supply, and the second channel is surrounded by a third annular channel for oxygen supply. Arrangement of annular concentric channels for supplying oxygen and fuel to gasification zones are known, as such, and will not be described in detail.

According to the invention, the oxygen and the fuel are supplied to the gasification zone through the respective channels at specific velocities in order to obtain a good atomization and mixing.

The invention will now be described in more detail by reference to the following example.

EXAMPLE

Tests have been carried out under the following conditions:

(a) Feedstock

| | |
|---|---|
| Specific gravity at 15° C. (kg/m$^3$) | 980–1018 |
| Viscosity at channel outlet (Pa.s) | 0.02–0.2 |
| Composition C % wt | 86.7–87.4 |
| H | 10.2–10.8 |
| S | 1.26–1.39 |
| N | 0.3–0.5 |
| ash | 0.064 |
| Typical metal content V ppm | 252 |
| Ni ppm | 82 |
| Fe ppm | 27 |
| Conradson carbon residue % wt | 23 |

(b) Oxygen Composition

| | |
|---|---|
| $O_2$ % vol | 99.05 |
| $N_2$ % vol | 0.01 |
| Ar % vol | 0.94 |
| $H_2O$ % vol | — |

(c) Operation Conditions

| | |
|---|---|
| Feedstock (fuel) | |
| Mass flow (kg/s) | 1.1–1.4 |
| Supply temperature to channel °C. | 120–170 |
| Supply pressure (MPa) | 3.6–3.7 |
| Velocity at fuel channel outlet (m/s) | 3.0–3.8 |
| Resulting slot width (mm) | 3 |
| Oxygen Containing Gas | |
| Oxygen to fuel ratio (kg/kg) | 1.0–1.3 |
| Steam to fuel ratio (kg/kg) | 0.3–0.65 |
| Supply temperature of mixture (°C.) | 210–220 |
| Supply pressure (MPa) | 3.6–3.7 |
| Distribution of Mass Flow and Velocity | |
| Central channel, 30 mass percent | 21–42 m/s |
| First concentric channel | 60–120 m/s |
| Third concentric channel wherein the mass flows through the first and third channels are distributed in an even manner. | 60–120 m/s |
| Reactor | |
| Pressure (MPa) 3.5 | |
| Temperature (°C.) 1300–1450 | |
| Typical Crude Syngas Composition Percent Volume Dry | |
| $CO_2$ = | 5.3–9.1 |
| $H_2S$ = | 0.1–0.3 |
| $O_2$ = | 0.0–0.1 |
| $H_2$ = | 44.7–47.5 |
| $N_2$ = | 0.1–0.4 |
| CO = | 43.7–48.9 |
| $CH_4$ = | 0.05–0.3 |

Unconverted carbon-containing products ca 0.3–4% by weight of fuel may be added to the feedstock.

Various modifications of the present invention will become apparent to those skilled in the art from the foregoing description. Such modifications are intended to fall within the scope of the appended claims.

What is claimed is:

1. A process for partial oxidation of a hydrocarbon-containing fuel comprising supplying an oxygen-containing gas and a hydrocarbon-containing fuel to a gasification zone through a concentric arrangement of three oxygen channels and one fuel channel, and oxidizing said fuel and producing auto-thermically a gaseous stream containing synthesis gas, the oxygen-containing gas being supplied through the central channel of the concentric arrangement at a velocity of 21–42 m/sec and through the first concentric channel encircling the central channel at a velocity of 60–120 m/sec, fuel being supplied through the second concentric channel encircling the first channel at a velocity of 3.0–3.8 m/sec, and oxygen-containing gas being supplied through the third concentric channel encircling the second channel at a velocity of 60–120 m/sec.

2. The process of claim 1 wherein the respective velocities are measured at the outlet of the respective concentric channels into the gasification zone.

3. The process of claim 1 wherein the hydrocarbon-containing fuel is a liquid.

4. The process of claim 3 where the oxygen-containing gas contains a moderator.

5. The process of claim 4 wherein the moderator is steam or carbon dioxide.

6. The process of claim 1 wherein the fuel is coal.

7. The process of claim 3 wherein 5 to 40 mass percent of the oxygen-containing gas is supplied through the central channel.

* * * * *